Feb. 12, 1957  J. R. WILLINGHAM  2,780,947
TUBULAR DRILL
Filed Dec. 24, 1953  2 Sheets-Sheet 1
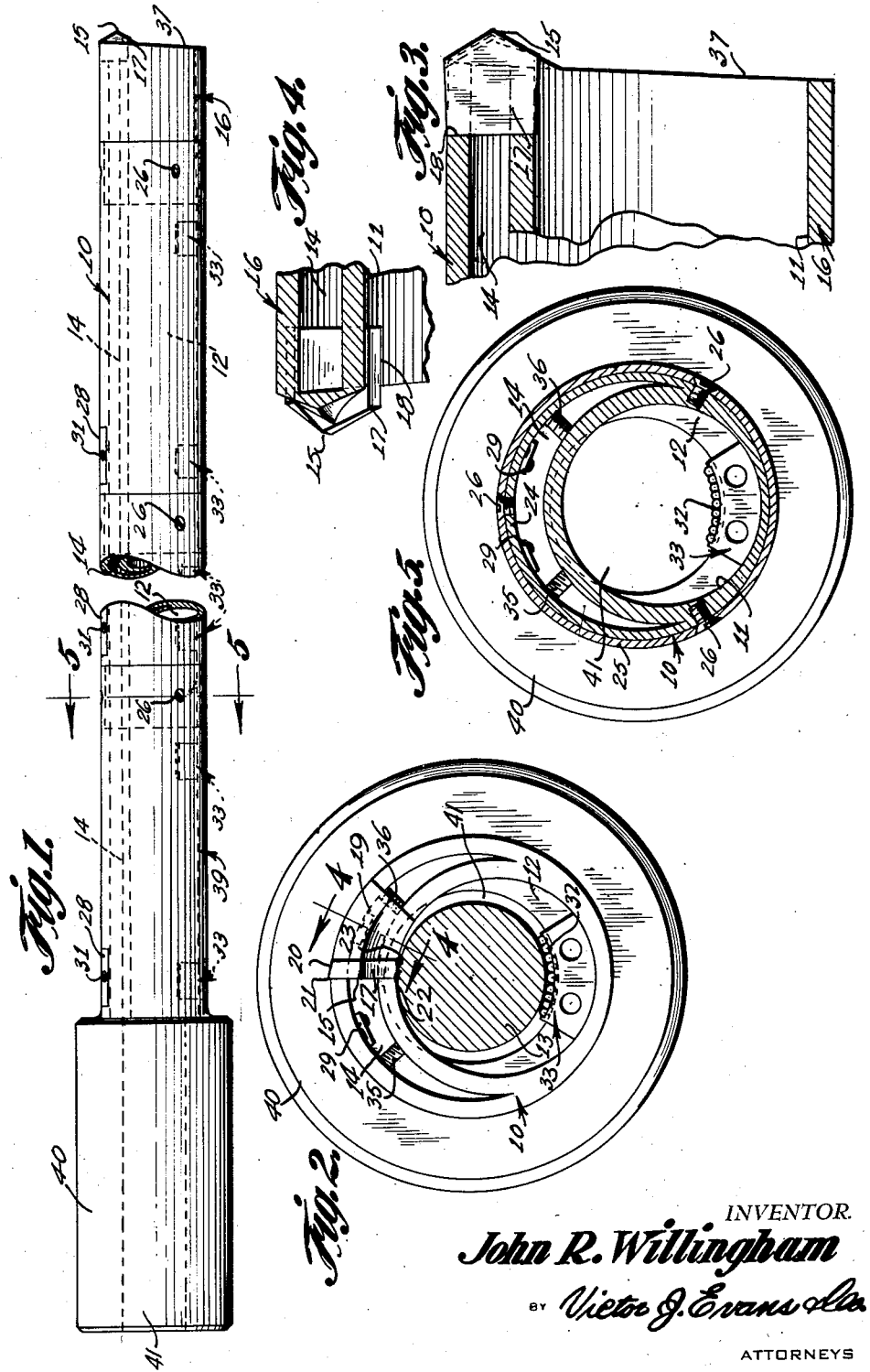
INVENTOR.
John R. Willingham
BY Victor J. Evans
ATTORNEYS

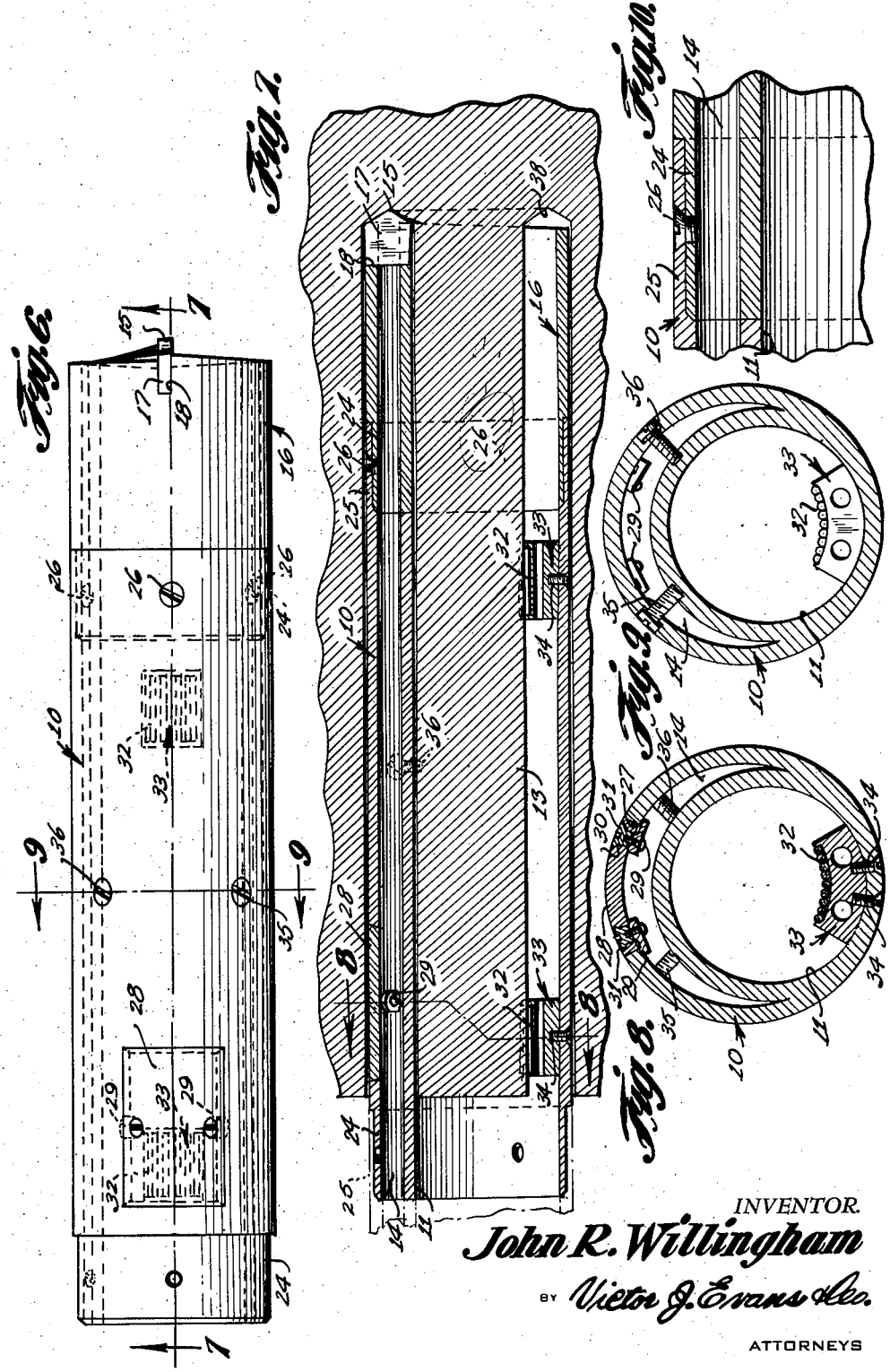

United States Patent Office 2,780,947
Patented Feb. 12, 1957

2,780,947

TUBULAR DRILL

John R. Willingham, Detroit, Mich., assignor to Star Cutter Co., Farmington, Mich., a corporation of Michigan Application December 24, 1953, Serial No. 400,270

3 Claims. (Cl. 77—69)

This invention relates to drills particularly adapted for drilling long holes such from four to twelve feet and longer as used in gun barrels, motor vehicle and aircraft engine blocks and the like, and in particular an elongated tubular shank having a drill tip of carbide or the like at one point on the extended end thereof and in which the intermediate or inner portion of the shank is relieved providing an eccentrally positioned longitudinally disposed lubricant channel in the side opposite to that on which the drill tip is positioned and also in which a longitudinally disposed crescent shaped chip carrying channel is provided in the side in which the drill tip is positioned.

The purpose of this invention is to provide a drill for large openings such as from four to twenty inches in diameter in which the drill tip is provided with lubricant supplied through a comparatively large channel in the center of the drill and in which chips are removed also through a comparatively large channel extended through the wall of the shank of the drill.

Various methods have been used for continuously supplying lubricant to drill tips for cooling the tips and also for lubricating the cutting surfaces, however, in conventional drills for this use the chip channels are provided in the peripheral surface of the drill body and in numerous instances the inner surface of the opening is scored by chips wedged between the trailing edges of the chip carrying channels and inner surface of the opening. With this thought in mind this invention contemplates an improved drill for large and long openings in which chips cut by the drill tip are carried through openings in the body of the drill so that the chips do not come in contact with the finished surface around the opening.

The object of this invention is, therefore, to provide means for forming the shank or body of a drill whereby a centrally disposed pin cut by the drill is eccentrically positioned in an opening through the center of the drill body whereby an open lubricant channel is provided and also whereby openings providing chip carrying channels may be extended through the body or shank of the drill.

Another object of the invention is to provide a tubular drill shank which is formed in sections whereby sections may be added as drilling is continued through a comparatively long opening.

Another important object of the invention is to provide an elongated tubular drill shank having an offset lubricant recess extended longitudinally therethrough and also having chip carrying channels extended through the wall thereof in which cover plates are provided to facilitate cleaning chips from said channels.

A further object of the invention is to provide an improved tubular drill for drilling large and long openings in which comparatively large lubricant and chip carrying channels are provided and in which the drill is of a comparatively simple and economical construction.

With these and other objects and advantages in view the invention embodies an elongated tubular sectional shank having a cutting drill tip at one point on one end with a longitudinally disposed recess in the inner surface and with longitudinally disposed chip carrying channels extended through the wall of the shank.

Other features and advantages of the invention will appear from the following description taken in connection with the drawings, wherein:

Figure 1 is a side elevational view of the improved tubular drill showing the shank extended from an adaptor and with parts of a section of the shank broken away.

Figure 2 is an end elevational view of the drill with the parts shown on an enlarged scale.

Figure 3 is a longitudinal section through the tip of the drill also with the parts shown on an enlarged scale.

Figure 4 is a detail showing a section taken on line 4—4 of Figure 2 illustrating the cutting tip or drill point.

Figure 5 is a cross section through the shank of the drill taken on line 5—5 of Figure 1 illustrating the method of connecting sections of the drill together.

Figure 6 is a side elevational view showing a portion of the drill shank with the drill tip carrying section mounted on one of the sections of the shank.

Figure 7 is a longitudinal section through the improved tubular drill taken on line 7—7 of Figure 6 and illustrating the drill in a piece of material.

Figure 8 is a cross section through the shank of the drill taken on line 8—8 of Figure 7 illustrating the mounting of a cover in an opening in a side of the shank of the drill and also showing a roller bearing in the side of the shank opposite to that in which the opening is positioned.

Figure 9 is a cross section through the intermediate part of one of the sections of the shank of the drill.

Figure 10 is a detail showing a longitudinal section between two sections of the drill shank illustrating a method of connecting sections of the shank and with the parts shown on a still further enlarged scale.

Referring now to the drawing wherein like reference characters denote corresponding parts the improved tubular drill of this invention includes a substantially cylindrical shank having an eccentrically positioned center opening, the shank being formed with sections 10 and the center opening, which is indicated by the numeral 11 being positioned as shown in Figure 5 whereby a crescent shaped area 12 is temporarily formed between a workpiece core 13 and the wall of opening 11 of the shank 10 while the drill is being used providing a lubricating channel, and an enclosed crescent shaped area 14 is provided in the opposite side of the shank forming a chip channel whereby fluid under pressure supplied through the area 12 provides lubricating means around the point, which is indicated by the numeral 15 and the lubricant with chips carried or suspended therein is returned through the area or chip channel 14.

The shank of the drill is provided with a drill tip carrying section 16, formed in cross section, as illustrated in the Figures 5, 8 and 9 having the offset centrally positioned opening 11 with the chip channel 14 and, as illustrated in Figures 3 and 4, a cutting drill tip 17 having a point as indicated by the numeral 15 and which is made of carbide, or the like, is secured in a recess 18 bridging the walls of the chip channel particularly as illustrated in Figure 3. The drill tip 17 is provided with an elongated tapering section 19, as illustrated in Figure 2 and, also as illustrated in Figure 2 the tip is provided with an upper beveled edge 20, the cutting edge 21 of which extends beyond the peripheral surface of the section 10 of the drill shank and the inner side of the tip is provided with a similar beveled surface 22, the cutting edge 23 of which projects inwardly beyond the inner surface of the eccentrically positioned opening 11. With the cutting edges of the drill tip extended beyond the surfaces of the body of the shank the shank is freely positioned in the opening and a core, such as the core 13, is spaced from the inner wall of the center opening 11 whereby the possibility of a core hanging in the shank of the drill is definitely eliminated.

Each of the sections of the shank of the drill is provided with an extending collar 24, as shown in Figure 10 and the collar is positioned to nest in an annular recess 25 in an adjoining section, the sections being secured together with screws, as indicated by the numeral 26 or by other suitable means.

Each section of the shank is also provided with an opening 27 that is closed with a cover plate 28, as shown in Figure 8, and the cover plates are secured in position with latches 29 on the inner ends of rotatably mounted studs 30 which are adapted to be turned, such as by the bit of a screwdriver in a slot 31 to adjust the positions of the latches to retain the cover in position in the opening or to release the cover from the opening.

The sections of the drill shank are also provided with core stabilizing elements, such as roller bearings 32 which are mounted in blocks 33 that are secured in the offset opening 11 of the sections by screws 34. The roller bearing units are spaced from the ends of the sections, as illustrated in Figure 7 and the units are positioned against the thin walls of the sections, being located opposite to the chip channels, as indicated by the numeral 14.

The sections may also be provided with locking screws 35 and 36 which extend through the outer walls of the sections and into the walls of the offset openings 11, as shown. The screws 35 and 36 provide means for reinforcing the walls of the sections and as many of the screws may be provided as may be desired.

As illustrated in Figure 3 the end section 16 of the drill shank, on which the tip 17 is positioned is provided with an inclined surface, as indicated by the numeral 37 and with the end surface formed in this manner a continuous lubricating channel 38 is provided at the end of the drill to facilitate circulation of lubricant through the area 12 to the cutting tip and this area also facilitates the return of the chips from the drill tip through the chip channel 14.

An end section 39 of the drill shank is mounted on an adaptor 40, having a bore 41 as shown in Figure 1 and it will be understood that fluid circulated through the drill shank may be returned through an opening, such as the opening 27 at the base of the shank or as desired.

With the parts formed in this manner a tubular drill is provided whereby the outer surface of the drill and shank is spaced from the inner surface of an opening formed by the drill and also wherein the center pin, such as the pin 13, is free of the inner surface of the opening through the drill shank.

It will be understood that modifications, within the scope of the appended claims, may be made in the design and arrangement of the parts witthout departing from the spirit of the invention.

What is claimed is:

1. A deep hole drill comprising an elongated tubular shank having an offset longitudinally disposed center opening extended therethrough, said shank being formed in separable sections, a drill tip positioned on one end of the shank and at the thick side thereof, the thick side of said shank having longitudinally disposed chip carrying channel extended therethrough, roller bearing stabilizing elements adapted to engage a workpiece core extended into said shank and blocks mounted in said shank in opposed relation to said chip carrying channel for supporting said roller bearing elements.

2. A deep drill comprising a plurality of alined sections having cylindrical peripheral surfaces with offset longitudinally disposed openings therethrough providing thin and thick sides, means rigidly connecting said sections to provide a tubular drill shank, and a drill tip positioned on the extended end of an end section and located on the thick side of the shank, the edges of said drill tip extended beyond the edges of the wall of the shank and said thick side of the shank having longitudinally disposed chip channel extended therethrough, roller bearing stabilizing elements adapted to engage a workpiece core extended into said shank and blocks mounted in said shank in opposed relation to said chip carrying channel for supporting said roller bearing elements.

3. A drill comprising a tubular shank having a cylindrical peripheral surface with an eccentrically positioned bore wherein the bore provides a thin wall on one side of the drill and a comparatively thick wall on the opposite side, said thick wall having a longitudinally disposed opening providing a chip carrying channel extended therethrough, a drill tip positioned on the thick portion of the wall and extended from the end of the drill, and longitudinally spaced bearings mounted on the inner surface of the thin portion of the wall of the drill.

References Cited in the file of this patent
UNITED STATES PATENTS

| | | |
|---|---|---|
| 841,184 | Roeske | Jan. 15, 1907 |
| 1,187,618 | Gridley | June 20, 1916 |
| 1,940,220 | McGrath | Dec. 19, 1933 |
| 2,418,021 | Fleischer | Mar. 25, 1947 |